United States Patent [19]

West et al.

[11] Patent Number: 5,269,489
[45] Date of Patent: Dec. 14, 1993

[54] STRUT ASSEMBLIES

[75] Inventors: Christopher N. West; David M. D. Rees; Andrew D. Belben; Brian F. Seymour, all of Yeovil, England

[73] Assignee: Westland Helicopters Limited, England

[21] Appl. No.: 840,091

[22] Filed: Feb. 24, 1992

[30] Foreign Application Priority Data

Feb. 28, 1991 [GB] United Kingdom ............... 9104190

[51] Int. Cl.⁵ .......................................... F16M 13/00
[52] U.S. Cl. .................................... 248/550; 248/638; 244/17.27; 188/299; 188/378; 267/136
[58] Field of Search ............... 248/550, 603, 638; 244/17.27; 188/299, 378; 267/136

[56] References Cited

U.S. PATENT DOCUMENTS 3,477,665  4/1969  Legrand .
4,536,114  8/1985  Belew ...................... 248/550 X
4,546,960 10/1985  Abrams et al. ........... 248/550 X
4,819,182  6/1989  King et al. .
4,848,525  7/1989  Jacot et al. ............... 267/136 X
4,974,794 12/1990  Aubry et al. .............. 267/136 X
5,042,784  8/1991  Murai et al. .............. 248/550 X
5,065,555 11/1991  Kobori et al. ............. 248/638 X
5,087,491  2/1992  Barrett ..................... 248/638 X Primary Examiner—Blair M. Johnson
Attorney, Agent, or Firm—Larson & Taylor

[57] ABSTRACT

A strut assembly includes an axially elastically extensible tube having attachment means at each end and an axially extensible actuator attached within the tube and between its ends so that reciprocal axial extensions of the actuator cause elastic longitudinal displacements of the strut assembly. Such a strut assembly is particularly useful for transmitting operational loads between parts of a structure and for inputting periodic loads into one of the parts as part of an active vibration control system.

7 Claims, 2 Drawing Sheets

STRUT ASSEMBLIES

BACKGROUND OF THE INVENTION

1. Field of the Invention

This invention relates to strut assemblies and particularly to strut assemblies for interconnecting parts of a structure for transmitting operational loads and for introducing forcing loads as part of an active vibration reducing system.

2. Description of the Prior Art

U.S. Pat. No. 4,819,182 describes an active vibration reducing system in which a plurality of force actuators are connected at or across locations between parts of a structure which are capable of relative movement at dominant vibrating forcing frequencies. A number of sensors measure the vibration response at key locations on the structural part in which vibration is to be reduced and the resulting signals are fed to an adaptive computer/controller which provides optimal signals to the actuators to produce forces at the sensor locations in the structural part. The actuators are powered by pulsed fluid supplies, preferably hydraulic supplies.

In such a system it is essential that the interconnected parts of the structure possess different stiffness and mass characteristics so that actuator forces are reacted by the part having the greater stiffness and mass to impart movement to the other part of the structure having the lower stiffness and mass and in which vibration is to be reduced.

The aforementioned vibration reducing system is particularly suited for use in helicopters in that a fuselage structure in which it is desired to reduce vibration is generally constructed to be lightweight and flexible and is attached beneath a gearbox and rotor structure that has a high mass and is constructed to be as rigid as possible. Not surprisingly then, an exemplary embodiment of U.S. Pat. No. 4,819,182 envisages connecting the force actuators between the gearbox and the fuselage although it is clear that other locations are possible. Furthermore, whilst such a system, known as a dual point actuation system, has been used the actuators can alternatively be connected between the fuselage structure at one point and a seismic mass to generate the required forcing. Such a system is termed a single point actuation system.

The system of U.S. Pat. No. 4,819,182 has been demonstrated on the Westland 30 helicopter and that installation is described in a paper presented at the 15th European Rotorcraft Forum in September 1989 titled "An evaluation of active control of structural response as a means of reducing helicopter vibration". In the Westland 30 the gearbox and rotor are mounted on a raft connected to the fuselage by four elastomeric units which provided an ideal location for the force actuators, and four electro-hydraulic actuators were incorporated in modified elastomeric units in which the actuators operate in parallel with the elastomer spring. Such a system of force actuators is however not widely applicable since in many helicopters the gearbox is attached directly to lift frame members in the fuselage either through a plurality of gearbox mounting feet or a plurality of external angled strut assemblies.

Such a strut assembly is disclosed for use with one embodiment of a prior single input/single output vibration reducing system that is the subject of U.S. Pat. No. 3,477,665. Thus, FIG. 7 of that specification discloses a strut assembly incorporating an electro-hydraulic jack straddling an oblate oval elastic ring which in operation is required to transmit primary lift and manoeuvring loads whilst permitting the jack to input forcing loads to reduce vibration.

Problems with the prior strut assembly are that the oval elastic ring represents an inefficient primary load path and it is difficult to tailor the bending loads in the ring to suit operational requirements in respect of both mechanical strength and elastic properties. The elastic ring requires a large space envelope and is bulky and heavy which may also frustrate installation in some applications.

These problems would be multiplied in attempting to utilise the strut assembly of U.S. Pat. No. 3,477,665 in the more sophisticated vibration reducing system of U.S. Pat. No. 4,819,182 because of the necessity for a plurality of jacks all inputting forcing loads simultaneously.

An objective of this invention is therefore to provide a strut assembly which overcomes the aforementioned problems.

SUMMARY OF THE INVENTION

Accordingly, in one aspect, this invention provides a strut assembly for interconnecting two parts of a structure for transmitting operational loads between the parts and for inputting periodic loads to at least one of the parts, said strut assembly comprising an axially elastically extensible tube having attachment means at each end for attaching said strut assembly between said parts and an axially extensible actuator attached within the tube between its ends, the axial stiffness of the tube being selected so that reciprocal axial extensions of the actuator cause elastic longitudinal displacements of the strut assembly to input said periodic loads.

The actuator may extend coaxially within the tube and may comprise a body portion attached to the attachment means at one end of the tube and an actuator ram attached to the attachment means at the other end.

Conveniently, the actuator body portion may be attached to an annular surface at an inner end of a tubular support member extending coaxially within the tube from said attachment means.

The actuator may comprise an electro-hydraulic actuator. Preferably, the axially elastically extensible tube is manufactured from fibre reinforced plastics materials.

In another aspect, this invention provides a strut assembly for interconnecting two parts of a structure for transmitting operational loads between the parts and for inputting periodic loads to at least one of said parts, said strut assembly comprising an axially elastically extensible tube having attachment means at one end for attachment to one of said structural parts and its other end attached to a support member having attachment means for connection to the other of said structural parts, an axially extensible actuator attached co-axially in the tube between said support member and the end of the tube, the axial stiffness of the tube being selected so that reciprocal extensions of the actuator cause elastic longitudinal displacements of the strut assembly to input said periodic loads.

In yet another aspect this invention provides a strut assembly for connecting a gearbox to a helicopter fuselage for transmitting flight loads from the gearbox to the fuselage and for inputting periodic forcing loads into the gearbox as part of an active vibration control system, said strut assembly comprising an axially elastically extensible tube having attachment means at its ends for attachment respectively to said gearbox and fuselage, an axially extensible actuator attached co-axially within the tube between its ends, the axial stiffness of the tube being selected to be capable of transmitting operational loads and so that reciprocal extensions of the actuator cause elastic longitudinal displacements of the strut assembly to input said periodic forcing loads.

BRIEF DESCRIPTION OF THE DRAWINGS

The invention will now be described by way of example only and with reference to the accompanying drawings in which.

DETAILED DESCRIPTION OF THE DRAWINGS

Figure 1:
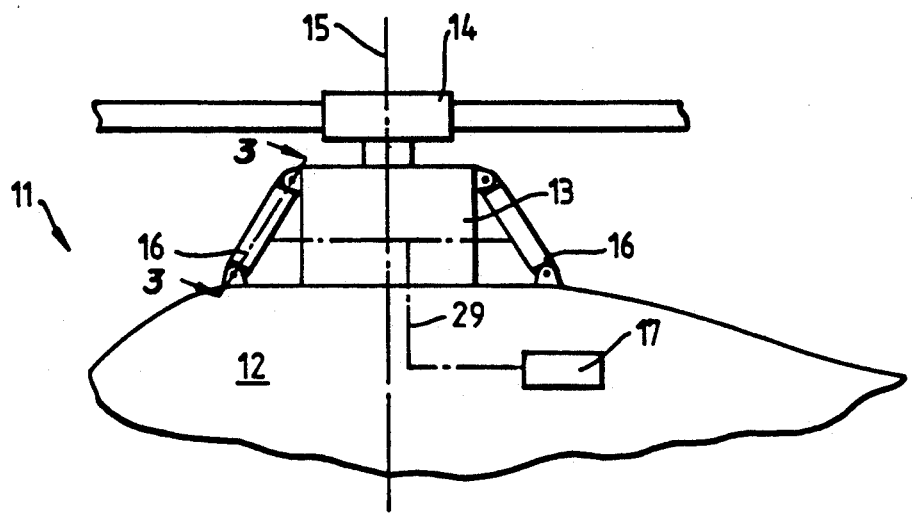
FIG. 1 is a generally schematic fragmentary sideview of a helicopter incorporating a plurality of strut assemblies constructed according to this invention.

Referring now to FIG. 1, a helicopter generally indicated at 11 has a fuselage 12 carrying a gearbox 13 driving a main sustaining rotor 14 about a generally vertical axis 15. Gearbox 13 is supported from the fuselage 12 by four strut assemblies 16 (two only being shown) attached between the gearbox 13 and fuselage 12.

Each of the strut assemblies 16 transmits primary flight and manoeuvring loads from the gearbox 13 to the fuselage 12. In addition each of the strut assemblies 16 incorporates an electro-hydraulic actuator 24 as hereinafter described, the actuators being connected to a controller 17 of an active vibration control system for inputting forcing loads as described in the aforementioned U.S. Pat. No. 4,819,182.

Figure 2:
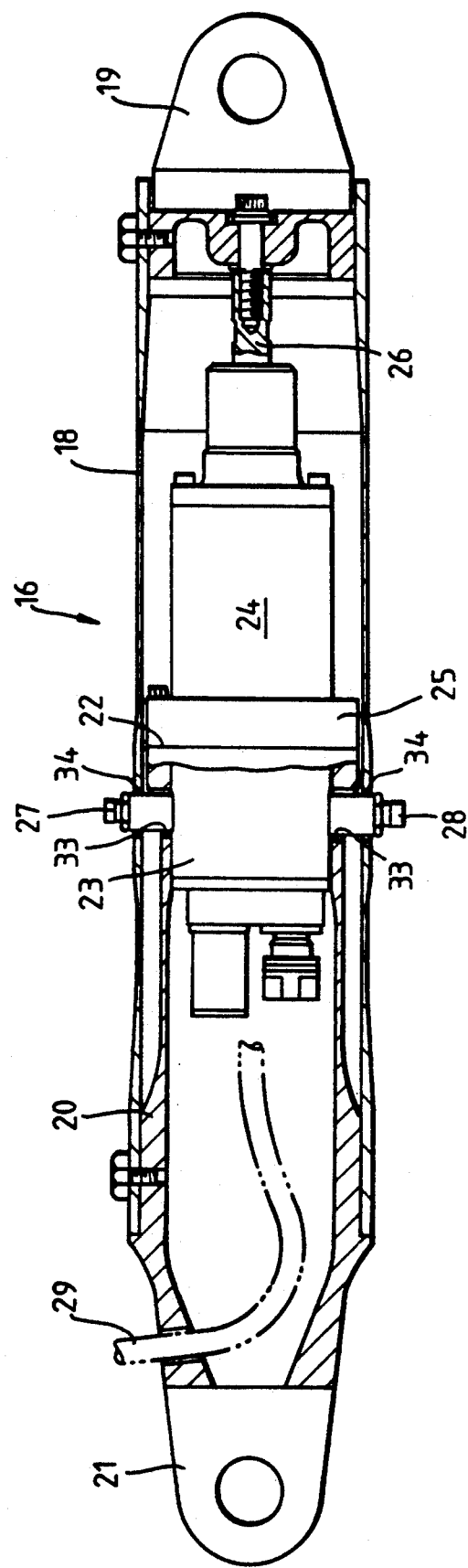
FIG. 2 is a longitudinal sectioned view of one of the strut assemblies taken on arrows A—A of FIG. 1.

As shown in FIG. 2, each strut assembly 16 includes an axially elastically extensible tube 18 manufactured from fibre reinforced plastics materials and having attachment means comprising apertured end fitting 19 bolted into one end to facilitate attachment to the gearbox 13. The other end of tube 18 is bolted to an external surface of a generally tubular co-axial support member 20 having an integral apertured end fitting 21 for attachment to the fuselage 12. The tubular end of support member 20 extends co-axially within tube 18 to terminate at an inner annular surface 22 partially along the length of tube 18.

A body portion 23 of the electro-hydraulic actuator 24 is bolted to the inner surface 22 of support member 20 through an integral flange 25 so as to extend co-axially in respect of the tube 18. An outer end of an actuator ram 26 of actuator 24 is bolted centrally to the end fitting 19 at the end of tube 18.

Hydraulic supply and return lines (not shown) are connected respectively to ports 27 and 28 extending radially from the body portion 23 and protruding through clearance holes 33 in the support member 20 and clearance holes 34 in the tube 18. Electrical signals from controller 17 (FIG. 1) are supplied to the actuator 24 through a cable 29 routed through an aperture in the wall of support member 20.

The stiffness characteristics of the axially elastically extensible tube 18 are determined for each particular application and are achieved by the choice of materials used in its manufacture and, in the case of fibre-reinforced materials, the particular lay-up of such materials.

Figure 3:
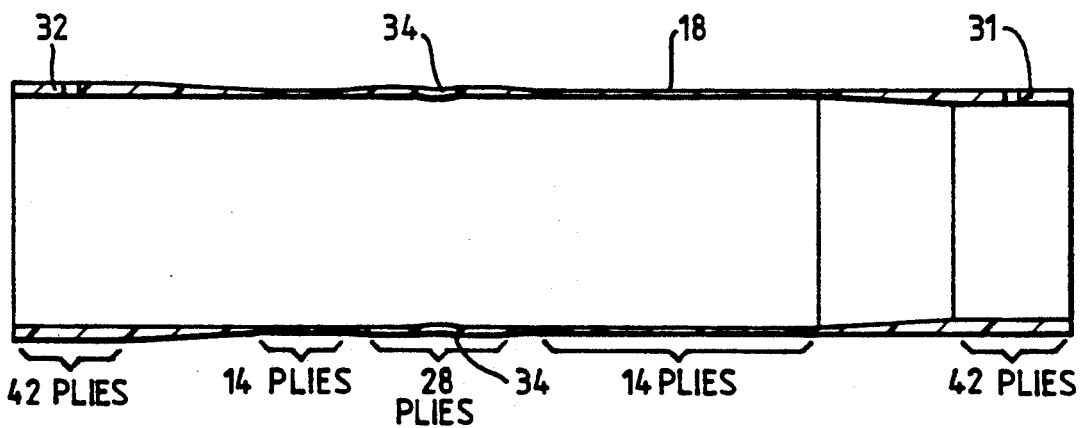
FIG. 3 is a longitudinal sectioned view of part of the strut assembly of FIG. 2.

Referring now to FIG. 3 the basic tube 18 of the illustrated embodiment comprises fourteen layers of unidirectional glass reinforcing fibres in a polymer matrix. The glass fibres are 'S' glass fibres and the polymer is a thermoplastic polyetheretherketone (PEEK) resin. Seven of the plies are arranged with the fibres at 0 degrees to the longitudinal axis of the tube 18 and seven plies are arranged with the fibres at ±45 degrees. The outer end of tube 18 which is attached to end fitting 19 (FIG. 2) is thickened internally at 31 by an additional twenty eight plies with the fibres arranged at both 0 and ±45 degrees, and the other end is thickened externally at 32 by a similar amount.

The use of fibre reinforced plastics materials facilitates the manufacture of the tube 18 and ensures it has the necessary mechanical strength and elastic properties in order for the strut assembly 16 to perform its operational functions.

Thus the tube 18 has sufficient mechanical strength to enable the strut assembly 16 to provide support between the helicopter fuselage 12 and gearbox 13 in order to sustain the lift and manoeuvre loads emanating from the sustaining rotor 14. Furthermore, the elastic properties of the tube 18 provide appropriate axial elastic extensibility such that the actuator 24 mounted in parallel and signalled from the controller 17 of the active vibration control system can input the displacements to introduce forcing loads into the strut assembly 16 by axial elastic extension of the tube 18 to control the dynamic response of fuselage 12 in the manner disclosed in U.S. Pat. No. 4,819,182.

The strut assembly 16 of this invention provides a simple, compact and lightweight device. The use of an axially elastically extensible tube 18 in parallel with the actuator 24 provides an efficient primary load path and the tube 18 can be readily tailored during manufacture to provide optimum mechanical strength and elastic properties.

The fibre reinforced tube 18 of the illustrated embodiment can be manufactured using any available techniques such as moulding using an inflatable inner mandrel and a female mould tool, and the fibre reinforced material can be in the form of pre-impregnated sheets or in the form of continuous fibres laid using available automated winding techniques.

Although described herein in respect of its application as part of a vibration reducing system on a helicopter, the strut assembly 16 of this invention can be used to good effect in other installations incorporating active vibration reducing systems. For example the strut assembly 16 could be used to support the engines in the engine bays of fixed wing aircraft to reduce fuselage vibration as well as in land or sea vehicles or in fixed installations. Furthermore, the strut assembly 16 of this invention can be used in both dual point and single point actuation systems and, in the latter type systems, it will be understood that the mass comprises one of the two structural parts interconnected by the strut assembly 16.

Whilst one embodiment has been described and illustrated it will be understood that many modifications may be made without departing from the scope of the invention. For example, other suitable fibre reinforced materials such as carbon or boron reinforcing fibres and thermosetting resins may be used for the manufacture of the axially elastically extensible tube 18. Furthermore, in some installations especially in which the weight of the strut assembly 16 is not a design consideration, the axially extensible tube 18 can be manufactured from metal, for example titanium. Other suitable forms of actuator can be used in place of the electrohydraulic actuator 24 of the described embodiment.

We claim:

1. A strut assembly for interconnecting two parts of a structure for transmitting operational loads between the parts and for inputting periodic loads to at least one of the parts includes an axially elastically extensible one-piece tube having attachment means at each end for attaching said strut between said parts and an axially extensible actuator attached within the tube between its ends, the tube being manufactured from material having mechanical strength and elastic properties selected to provide a predetermined axial stiffness so that reciprocal axial extensions of the actuator cause elastic longitudinal displacements of the strut assembly to input said periodic loads.

2. A strut assembly as claimed in claim 1 wherein said actuator extends co-axially within the tube and includes a body portion attached to the attachment means at one end of the tube and an actuator ram attached to the attachment means at the other end.

3. A strut assembly as claimed in claim 2 wherein said actuator body portion is attached to an annular surface at an inner end of a tubular support member extending co-axially within the tube from said attachment means.

4. A strut assembly as claimed in claim 1 wherein said actuator is an electro-hydraulic actuator.

5. A strut assembly for interconnecting two parts of a structure for transmitting operational loads between the parts and for inputting periodic loads to at least one of said parts includes an axially elastically extensible one-piece tube having attachment means at one end for attachment to one of said structural parts and its other end attached to a support member having attachment means for connection to the other of said structural parts, an axially extensible actuator attached co-axially in the tube between said support member and the end of the tube, the tube being manufactured from material having mechanical strength and elastic properties selected to provide a predetermined axial stiffness so that reciprocal extensions of the actuator cause elastic longitudinal displacements of the strut assembly to input said periodic loads.

6. A strut assembly for connecting a gearbox to a helicopter fuselage for transmitting flight loads from the gearbox to the fuselage and for inputting periodic forcing loads into the gearbox as part of an active vibration control system, said strut assembly comprising an axially elastically extensible one-piece tube have attachment means at its ends for attachment respectively to said gearbox and fuselage, an axially extensible actuator attached co-axially within the tube between said support member and the end of the tube, the tube being manufactured from a material having mechanical strength and elastic properties selected to provide a predetermined axial stiffness capable of transmitting operational loads and so that reciprocal extensions of the actuator cause elastic longitudinal displacements of the strut assembly to input said periodic forcing loads.

7. A strut assembly for interconnecting two parts of a structure for transmitting operational loads between the parts and for inputting periodic loads to at least one of said parts includes an axially elastically extensible one-piece tube having attachment means at one end for attaching said strut between said parts and an axially extensible actuator attached within the tube between its ends, the tube being manufactured from fibre reinforced plastics materials having mechanical strength and elastic properties selected to provide a predetermined axial stiffness such that reciprocal axial extensions of the actuator cause elastic longitudinal displacements of the strut assembly to input said periodic loads.

* * * * *